June 7, 1938.    R. G. TULLY    2,120,051
REAR AXLE BLOCK FOR AUTOMOBILE LIFTS
Filed July 12, 1937
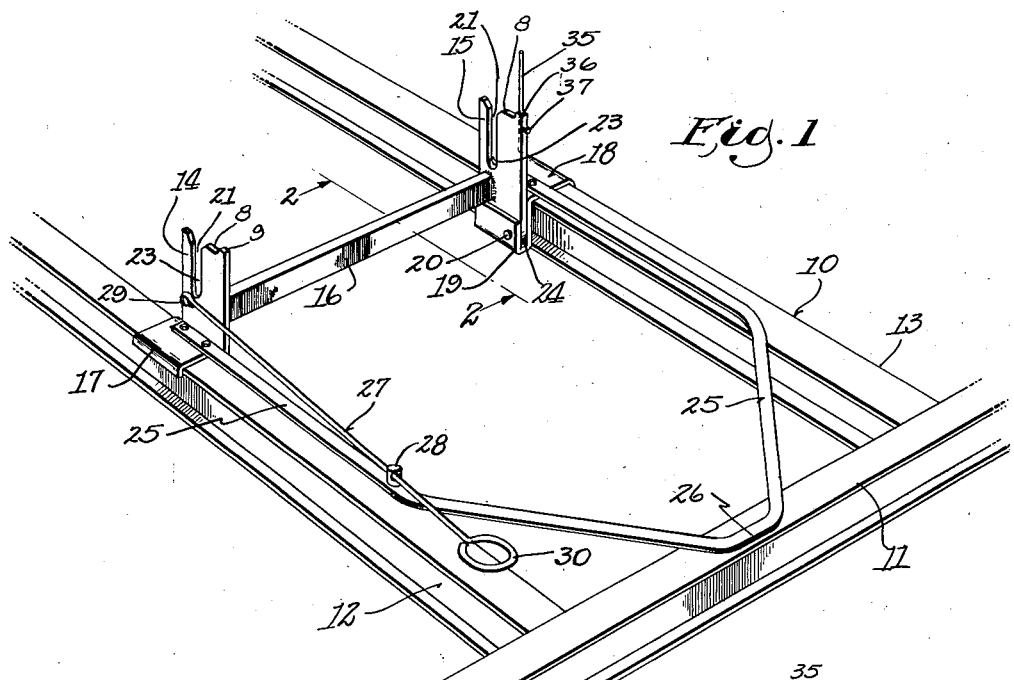
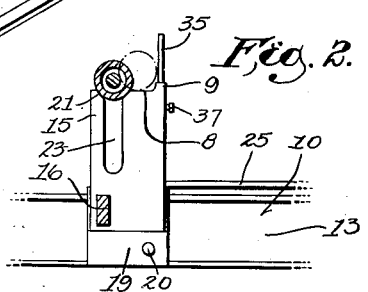
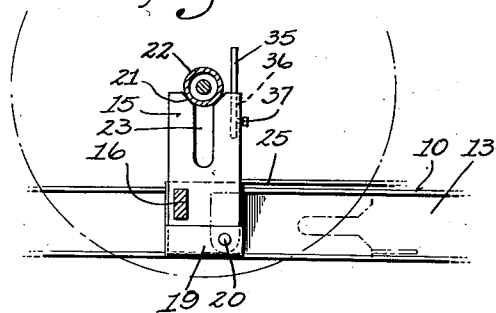
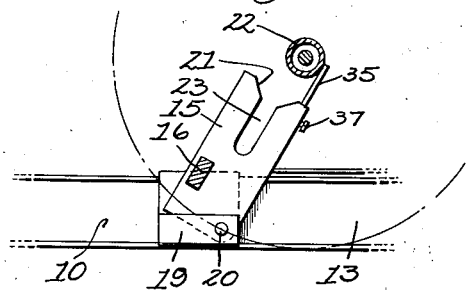
INVENTOR
Richard G. Tully
BY
Wheeler, Wheeler + Wheeler
ATTORNEYS Patented June 7, 1938

2,120,051

UNITED STATES PATENT OFFICE 2,120,051

REAR AXLE BLOCK FOR AUTOMOBILE LIFTS

Richard G. Tully, Wauwatosa, Wis., assignor to Walker Manufacturing Company, Racine, Wis., a corporation Application July 12, 1937, Serial No. 153,083

9 Claims. (Cl. 254—89)

My invention relates to improvements in rear axle blocks for lifts, with particular reference to lifts of the general character known as automobile lifts.

In automobile or vehicle lifts of various types of construction it is customary to provide a pair of rails which are spaced somewhat more narrowly than the tread of the wheels of the vehicle, to provide means for lifting those rails into contact with the axles of the vehicle, and in the further elevation of the rails to lift the entire vehicle to a proper height so that workmen may stand beneath and reach up to the working parts which may require attention. If, however, the rear axle of the vehicle is rested directly upon the supporting frame the rails are so closely associated with the working parts of the vehicle that work may be impeded. Furthermore, in the construction of many of the modern motor cars there are depending portions of the vehicle structure such as fuel tanks, spare tires, batteries, mufflers, etc., which may be damaged by coming in contact with the rails.

It is therefore an object of my invention to provide automatically retractable or collapsible rear axle "blocks" to support the axle above the longitudinal frame members of a vehicle lift.

Another object of my invention is to provide for means which will enable the user of my rear axle blocks to manipulate and adjust my rear axle blocks from a safe place of vantage so that he may not be required to place himself in a dangerous position while adjusting or setting up the blocks.

Another object of my invention is to provide for means incorporated in my rear axle blocks for automatically displacing them to a retracted or collapsed position when a vehicle is to be "rolled off" the lift, thereby safeguarding the under parts of the vehicle.

In the drawing:

Figure 1 is a perspective of my rear axle blocks installed upon a portion of an automobile lift.

Figure 2 is a section on line 2—2 of Figure 1.

Figure 3 shows a modified form of block in a view similar to that shown in Figure 2.

Figure 4 is a view similar to Figure 3 and showing the rear axle of a vehicle automatically forcing my rear axle blocks to retracted position.

Like parts are designated by the same reference characters throughout the several views.

I have shown my rear axle blocks installed upon the elevatable portion 10 of an automobile lift which includes a cross frame member 11 and two longitudinal frame members or rails 12 and 13, the portion of the lift illustrated in the drawing being that portion which underlies and supports the rear end of an automotive vehicle.

My rear axle jacks may be said to be primarily a pair of upright plates 14 and 15 bracketed together by means of a strut 16 which is rigidly secured to the jacks 14 and 15 by welding or other suitable attachment. My jacks or plates 14—15 with the strut 16 therefore comprise a unitary construction which is pivotally attached to two saddles 17 and 18, respectively, which are shaped as indicated most clearly in Figure 1 to engage the tops of the respective rails 12—13 and are provided with U-shaped inner stirrups 19 shaped to receive the plates 14—15 and to provide a support for either end of a pivot pin 20 which extends through the lower rear corner of each of the plates 14 and 15.

The plates 14—15 are notched forwardly in their top portions at 21 to receive any standard shape of axle 22, and each of said plates is deeply slotted at 23 to receive any trusses or cross rods that may extend below an axle in some makes of vehicles. The lower rear corner of each of the plates is rounded at 24 to permit of the "retraction" of my blocks pivotally as indicated in Figure 4 or as indicated in dotted lines in Figure 3. A flat portion or platform 8, rearwardly of the notch at the top of each block, is defined rearwardly by a stop 9 comprising an upward extension of the block so that an axle may be received upon the flat platform 8 and against the stop 9 and still be positioned forwardly of a vertical line drawn through the pivot pin 20.

The two saddles 17 and 18, although spaced and held together by the unitary construction of the plates 14—15 and strut 16 are further braced and spaced by means of a yoke-shaped handle 25 which is so shaped and which is sufficiently long so that the grip 26 thereof may extend to a safe position behind any vehicle which may be lifted by the lifting frame 10.

Along one side of the yoke 25 I provide an operating rod 27 retained and loosely guided by an apertured lug 28 secured to the yoke. The forward end of the operating rod 27 is pivotally secured to plate 14 by means of an eye and shoulder screw 29, and the handle 30 of the rod 27 is disposed within easy reach of a workman who has positioned my rear axle blocks by means of the yoke 25 held manually at the grip 26. Thus, if the yoke 25 and its attached parts including the rear axle blocks 14 and 15 is slidably positioned under the rear end of the vehicle at a time when the rear axle blocks are in horizontal position, as indicated in dotted lines in Figure 3, the blocks may be pivotally moved to the position shown in full lines in Figures 1 and 2 by a thrust upon the handle 30.

The unitary assembly, including the yoke, the saddles, and the stirrups, may be referred to as a mounting, which is adjustable along the rails or other mechanism included in the "lift", which mounting is provided with my rear axle blocks.

Many ordinary vehicles as constructed today have heavy overhanging parts at the rear end thereof so that difficulty may be encountered in positioning two plates 14 and 15 directly under an axle 22. I therefore provide a guide and retractor pin 35 set into a hole 36 in the top margin of plate 15 and the pin 35 may be adjusted to the height desired and retained in adjusted position by means of a set screw 37. Thus, when the blocks are thrust forwardly by means of the yoke 25, the guide pin 35 will contact the axle whereby to indicate to the operator when the blocks are accurately positioned. Furthermore, when the lifting frame 10 has been lowered to the floor and the axle 22 is no longer being supported by the plates 14—15, no further attention is required for the retraction of the plates to their horizontal position since the pin 35, when thrust rearwardly by the axle 22, will force the blocks to their retracted position where they cannot contact the under parts of a vehicle and damage mufflers and batteries as the car is backed off.

It will be noted that when the full weight of a vehicle axle is upon my axle blocks the pin 20 is offset rearwardly a considerable distance from the center of vertical thrust, and that a tremendous rearward force would be and is required to pivotally move the blocks 14—15 while the vehicle is being supported thereby. However, when the lift 10 has been lowered to its lowermost position and the weight of a vehicle is supported by its own wheels, my blocks are free to move pivotally to their retracted position, either by reason of a pulling operation upon the handle 30 or by reason of the thrust upon the safety guide 35.

I claim:

1. In a vehicle lift including a mounting to be initially raised into position to elevate the axle of a vehicle, a lifting block pivotally associated with said mounting whereby to move from axle lifting position to retracted position and shaped to engage the axle whereby in the movement of the vehicle off of said lift to pivotally move the block to retracted position.

2. In a lift of the described class, the combination with a mounting adapted to be initially adjusted underneath a load and then raised to a lifting position, said mounting being provided with a stirrup, of a lifting block pivoted to the stirrup adjacent one margin thereof for adjustment to and from a load receiving position, said block in load receiving position being supported wholly by said pivoted mounting and said stirrup.

3. In a vehicle lift provided with spaced rails to be elevated beneath the axles of the vehicle, blocks pivotally associated with said rails whereby to move from an upright axle receiving position to a retracted position, said blocks being provided with means to engage the axle whereby in the movement of the vehicle over said rails to move the blocks to retracted position.

4. In a vehicle lift provided with spaced rails to be elevated beneath the axles of the vehicle, blocks pivotally associated with said rails whereby to move from an upright axle receiving position to a retracted position, said blocks being provided with means to engage the axle whereby in the movement of the vehicle over said rails to move the blocks to retracted position, said blocks being joined unitarily, and one of said blocks being provided with a handle whereby manually to move the blocks to axle engaging position.

5. A vehicle lift provided with elevatable means to be raised beneath the axle of the vehicle, and over which a vehicle may be moved to and from a position for elevation, a block associated with said means for movement to and from an axle engaging position and to and from a retracted position, said block being provided with means for engagement with a portion of the vehicle whereby in the movement of the vehicle from the lift to force the block to retracted position.

6. In a vehicle lift designed to be associated with a vehicle runway over which a vehicle may be conducted on its own wheels, said lift being provided with spaced rails longitudinally extended with respect to the vehicle and adapted to be lifted beneath the axles of the vehicle, saddles slidably associated with said rails and shaped to receive axle blocks adjustable from an upright axle engaging position to a recumbent position beside said rails, one of said blocks being provided with a guide pin for engagement with a portion of the vehicle when the rails are in their lowered position and the blocks are not in contact with the axle whereby in the movement of the vehicle longitudinally of said rails to move said block to its retracted or recumbent position.

7. In a vehicle lift designed to be associated with a vehicle runway over which a vehicle may be conducted on its own wheels, said lift being provided with spaced rails longitudinally extended with respect to the vehicle and adapted to be lifted beneath the axles of the vehicle, saddles slidably associated with said rails and shaped to receive axle blocks adjustable from an upright axle engaging position to a recumbent position beside said rails, one of said blocks being provided with a guide pin for engagement with a portion of the vehicle when the rails are in their lowered position and the blocks are not in contact with the axle whereby in the movement of the vehicle longitudinally of said rails to move said block to its retracted or recumbent position, said blocks comprising a unitary structure and provided with a hand lever for moving the blocks to and from axle engaging position.

8. In a vehicle lift designed to be associated with a vehicle runway over which a vehicle may be conducted on its own wheels, said lift being provided with spaced rails longitudinally extended with respect to the vehicle and adapted to be lifted beneath the axles of the vehicle, saddles slidably associated with said rails and shaped to receive axle blocks adjustable from an upright axle engaging position to a recumbent position beside said rails, one of said blocks being provided with a guide pin for engagement with a portion of the vehicle when the rails are in their lowered position and the blocks are not in contact with the axle whereby in the movement of the vehicle longitudinally of said rails to move said block to its retracted or recumbent position, the saddles upon said spaced rails being connected by a U frame, one of said blocks being provided with a handle for manual movement of the blocks to and from axle engaging position, said handle extending along said U frame.

9. In a vehicle lift including a mounting to be initially raised into position to elevate the axle of a vehicle, a lifting block pivotally associated with said mounting whereby to move from axle lifting position to retracted position, the block having a surface shaped to receive the axle when in lifting position and said surface being substantially below the axle before the mounting has been raised, said block being provided with means positioned to be abutted by the axle whereby in the movement of the vehicle off of said lift to move the block to retracted position.

RICHARD G. TULLY.